Fig. 1

INVENTOR.
Robert H. Schaefer
BY
a. M. Keiter
ATTORNEY

United States Patent Office 3,459,071
Patented Aug. 5, 1969

3,459,071
TRANSMISSION CONTROL
Robert H. Schaefer, Westfield, Ind., assignor to General
Motors Corporation, Detroit, Mich., a corporation of
Delaware
Filed Feb. 5, 1968, Ser. No. 702,942
Int. Cl. F16h *57/10*
U.S. Cl. 74—758          23 Claims

ABSTRACT OF THE DISCLOSURE

A control system for a power transmission having a range unit, a splitter unit and a reverse unit is disclosed in which the engagement of one or more of the friction devices, of the splitter unit and reverse unit, is controlled by a variable pressure reducing valve to permit the transmission to be engaged, under load, without the use of a fluid coupling or torque convertor. Also, the control has shift valves connected in series such that engagement of a high ratio in the range unit by one shift valve automatically disconnects system pressure from the shift valves which control lower ratios in the range unit.

---

This invention is related to control systems and more particularly to control systems for multi-speed power transmissions driven directly by an internal combustion engine.

The invention employs an engagement control valve which is operable to control the pressure level of the fluid which engages the friction devices of a splitter planetary unit or a reverse planetary unit. The control of these friction devices permits a gradual connection between the engine and the driving wheels of a vehicle when it is desired to start the vehicle moving without the use of a fluid drive device between the engine and the transmission. Manually controlled pilot operated shift valves permit the operator to select various drive ratios without disconnecting the engine from the driving wheels. The shift valves which control the friction devices of the range unit in the transmission are staged so that selection of one ratio disconnects shift valves controlling lower ratio from the source of pressure so that lower ratio friction devices are automatically disengaged. Thus it is not necessary to return the shift valves to their unshifted position upon the immediate engagement of a higher ratio friction device. Conversely, a lower ratio cannot be established until the shift valve, controlling a higher ratio, has returned to its unshifted position.

The manual control for the shift valves has been designed to permit selective pressure distribution to signal ports of the shift valves such that in forward drive ratios only one or none of the range shift valves are energized, depending upon the ratio desired. This is accomplished through the use of an oblique passage which supplies fluid from a central passage in the manual control to a groove between a double land on the manual control so that only one port, aligned with the groove, will be pressurized. The remaining ports are exhausted through a second oblique passage, connecting both sides of the double land, and an exhaust port at one end of the valve bore which carries the manual control.

It is an object of this invention to provide a control for a power transmission in which the engagement of a plurality of friction devices in the transmission may be manually or automatically controlled.

It is another object of this invention to provide a control for a transmission in which a shift valve controlling a low ratio is disconnected from the source of pressure upon actuation of a shift valve controlling a higher ratio.

A further object of this invention is to provide a manual control valve having parallel fluid passages which selectively direct a shift signal pressure to shift one shift valve while providing an exhaust connection to permit other shift valves to assume their unshifted position.

It is another object of this invention to provide a manually controlled variable pressure reducing valve which may be used in a transmission control system to permit an operator to selectively engage, disengage or otherwise control the torque capacity of a plurality of friction actuated drive ratio establishing devices.

These and other objects of this invention will be more apparent from the following description of the preferred embodiment of the invention illustrated by the accompanying drawings in which:

Figure 1:
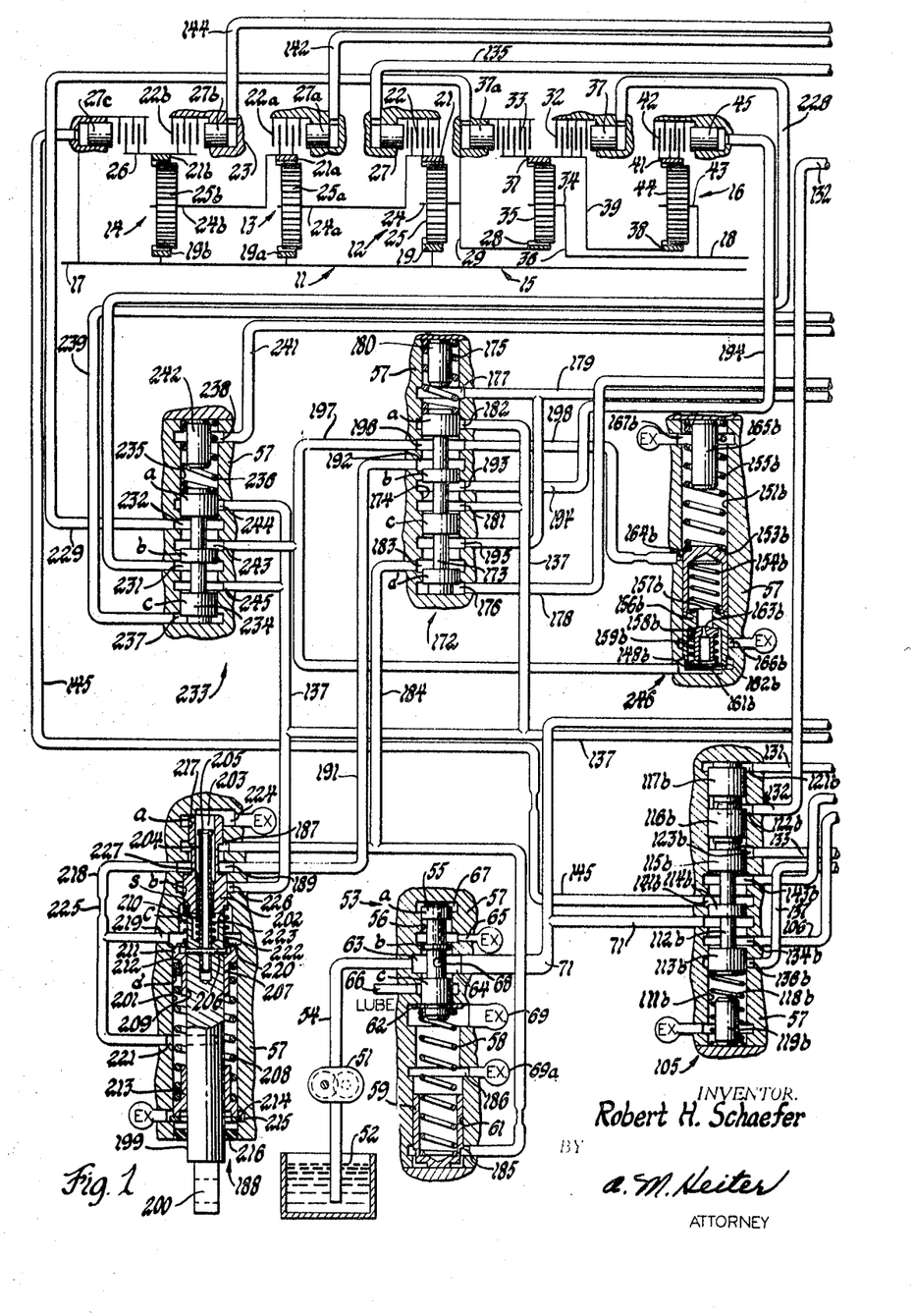
FIGURE 1 is a diagrammatic view of a transmission and a portion of the control system.
Figures 1A, 2:
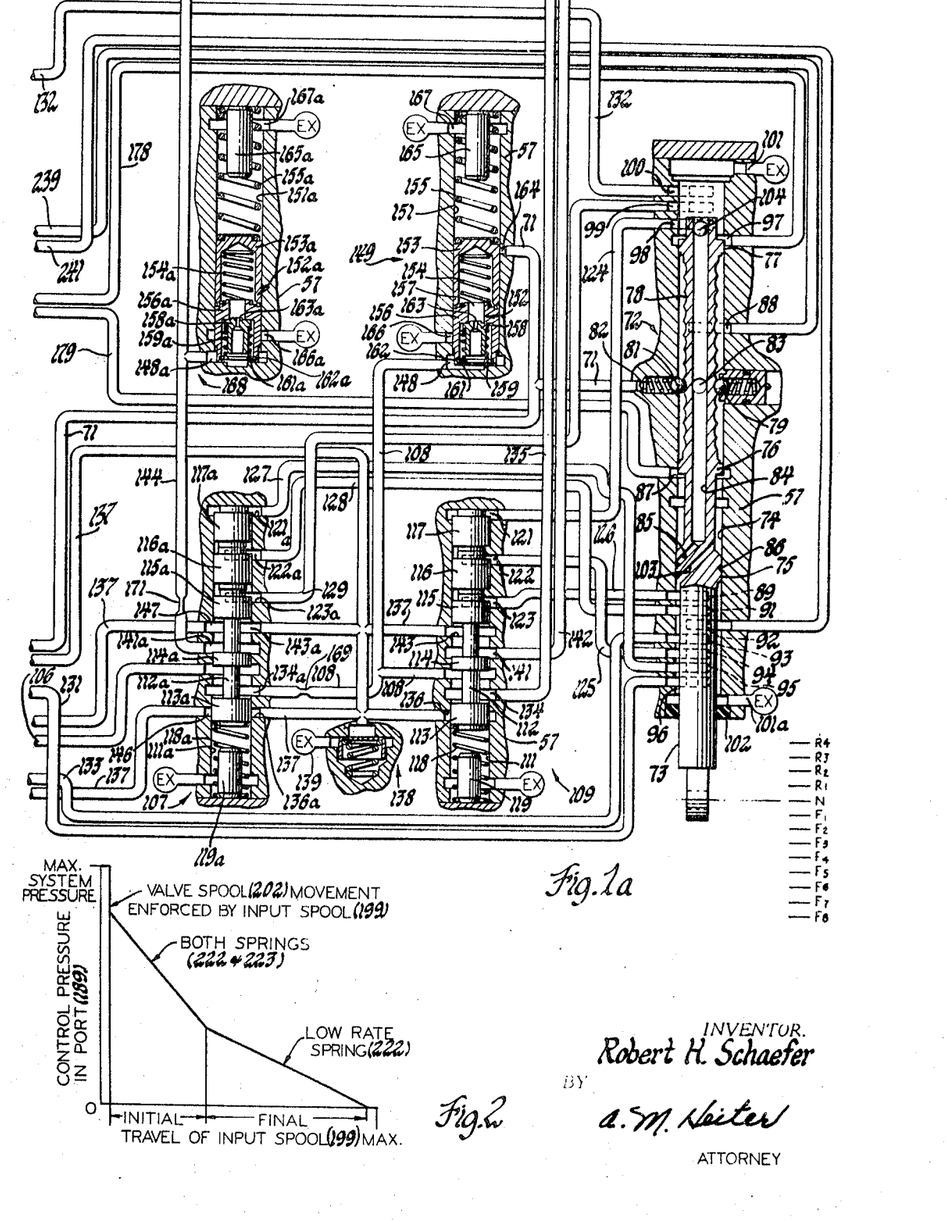
FIGURE 1a is a diagrammatic view of the remainder of the control system.
FIGURE 2 is a curve showing the relation between control pressure and engagement control valve travel.

There is found in FIGURE 1 and 1a, a transmission having a range unit generally designated as 11 including a low ratio planetary set 12, intermediate ratio planetary set 13, a third ratio planetary set 14, a splitter planetary set 15, and a reverse planetary set 16. The transmission has an input shaft 17 drivingly connected to the planetary sets of the range unit 11 and an output shaft 18 drivingly connected to the splitter unit 15 and the reverse unit 16. The planetary units 12, 13, and 14 of the range unit 11 each respectively have a sun gear 19, 19a and 19b drivingly connected to the input shaft 17, and a ring gear 21, 21a and 21b which is operatively connected by a brake 22, 22a and 22b respectively to a transmission housing 23. Also included in the planetary sets 12, 13 and 14 of the range unit 11 are carrier members 24, 24a and 24b, each having a plurality of pinions 25, 25a and 25b respectively, meshing with the sun gear 19, 19a and 19b and the ring gear 21, 21a and 21b of their respective planetary sets. A lockup clutch 26 is operatively connected between the input shaft 17 and the ring gear 21b of planetary set 14. The planetary sets of the range unit 11 are interconnected such that the carrier 24b of planetary set 14 is drivingly connected to the ring gear 21a, planetary set 13 and the carrier 24a of planetary set 13 is drivingly connected to the ring gear 21 of planetary set 12 while the carrier 24 of the planetary set 12 is an output member for the range unit 11. Each of the brakes 22, 22a and 22b and the clutch 26 are actuated by a hydraulic motor 27, 27a, 27b and 27c respectively which are selectively energized by a control system to provide four drive ratios in the range unit.

The splitter unit 15 includes a sun gear 28 drivingly connected by a hub member and sleeve shaft 29 to the carrier 24 of planetary set 12, and a ring gear 31 which may be selectively held from rotation by a brake 32 or drivingly connected to the sun gear 28 by a clutch 33. A carrier member 34 has a plurality of pinion gears 35 which mesh with the sun gear 28 and the ring gear 31 and is drivingly connected by a hub member 36 to the output shaft 18. The brake 32 and the clutch 33 each have a hydraulic motor 37 and 37a which are selectively energized by the control circuit to provide low and high splitter ratios respectively.

The reverse unit 16 has a sun gear 38 drivingly connected by a hub 39 to the ring gear 31 of the splitter unit and a ring gear 41 which may be selectively held from rotation by a brake 42. Also included in the reverse unit is a carrier member 43 which is drivingly connected to the output shaft 18. The carrier 43 has rotatably mounted thereon a plurality of pinions 44 which mesh with the sun gear 38 and ring gear 41. The brake member 42 has a hydraulic motor 45 which is selectively energized by the control circuit.

The range unit 11, by selective engagement of brakes 22, 22a and 22b or clutch 26, will provide four-speed ratios between the input shaft 17 and the carrier member 24 of the planetary set 12 thus providing four input ratios to the splitter unit 15 or the reverse unit 16. By selective actuation of the brake 32 or clutch 33 of the splitter unit 15, two-speed ratios between sun gear 28 and output shaft 18 are provided. When these two ratios are combined with the four ratios from the range unit 11, a total of eight forward drive ratios are provided. Energization of brake 42 provides a reverse ratio between the carrier 24 of the planetary set 12 and the output shaft 18. Thus the four drive ratios available in the range unit 11, when taken in conjunction with the reversing unit 16, will provide four reverse drive ratios between input shaft 17 and output shaft 18.

The control system for this transmission permits the operator to select eight forward ratios, a neutral position and two reverse ratios. The fluid used in controlling the transmission is supplied by an engine driven pump 51 which draws fluid from a sump 52 and directs it to a regulator valve 53, which controls maximum system pressure, via passage 54. The regulator valve 53 includes spool 55 in bore 56 in valve body 57. The spring 58 abuts a cup-shaped plug valve 59 which is fitted in the closed end of bore 61 having vent exhausts 69 and 69a. The spring 58 is held in compression between the plug valve 59 and a snapring 62 which is fixed on one end of the valve spool 55. The valve spool 55 has three equal diameter lands a, b, and c which are in close sliding relationship with valve bore 56. The valve bore 56 has an inlet port 63 connected to passage 54, an exhaust port 65 and a lube port 66. Fluid from the pump enters the regulator valve at port 63, passes out of the regulator valve to line 71. Fluid from the port 63 also enters chamber 67 at the upper end of bore 56, via through passage 68 in the spool 55. Line 71 leads to an essentially closed circuit. Accordingly, the fluid from the pump causes a pressure to be built up in chamber 67 to urge the valve 55 downward against the spring 58. The initial movement of valve 55 permits flow from port 53 past valve 55 land c to lube port 66. The flow capacity of pump 51 is in excess of the lube flow capacity. Accordingly, valve 55 continues to move to permit the excess fluid to flow past land b to exhaust port 65. When the valve 55 reaches this position, the flow to 66 and 65 equals the instant pump flow so that equilibrium exists. The pressure in line 71 equals the instant spring force divided by the area of valve 55 end a. Passage 71 directs regulated fluid to valve 72.

The manual valve 72 includes a spool 73 that is operated manually via linkage, not shown, in valve bore 74 in valve body 57. The valve spool 73 has a double land portion 75 and single land portions 76 and 77. Between the single land portions, 76 and 77 is an undercut section of the valve spool 73 having a plurality of grooves 78 which cooperate with ball detent members 79 and 81 to resiliently hold the valve in a position selected by the operator. Fluid enters the manual valve from line 71 via port 82 around the ball detent member 81 into the valve bore between lands 76 and 77. A cross passage 83 permits fluid in the groove area to enter an axial drilled passageway 84 in the center of the manual valve which is intersected by an oblique passage 85. The oblique passage 85 permits pressure fluid to enter a recessed portion 86 of the double-land portion 75. The valve has a plurality of outlet ports 87, 88, 89, 91, 92, 93, 94, 95, and 96 which function during forward operations of the transmission and ports 97 and 98, 99 and 100, along with port 88 which are functional during reverse operation transmission. The valve also has two exhaust ports 101 and 101a at either end of the valve bore. A seal member 102, in contact with the valve spool 73, prevents leakage of fluid from the valve bore to atmosphere. An oblique passage 103 provides an exhaust connection from the portion of the valve spool between the double land 75 and the single land 76 to the exhaust port 101a. A ball 104 is pressed into the end of axial aperture 84 to prevent the pressurized fluid therein from being exhausted via exhaust passage 101.

A portion of passage 71 is directed to the fourth shift valve 105. A passage 106 connects passage 71, through the fourth shift valve 105, to a third shift valve 107 and a passage 108 connects passage 106, through the third shift valve to a first and second shift valve 109. The structure of the shift valves 105, 107 and 109 is very similar thus a description of one will suffice for all. The description will be given for the first and second shift valve 109, while the corresponding structure of the third shift valve 107 and the fourth shift valve 105 will be given an "a" and "b" suffiix respectively. The first and second shift valve 109 includes a bore 111 in the valve body 57, a valve spool 112 having three equal diameter lands 113, 114 and 115 in slidable sealing relationship in bore 111 with recessed portions therebetween, two single-land plug valves 116 and 117 having the same diameter as lands 113, 114 and 115 of valve spool 112, bias spring 118 contacting one end of valve spool 112 and seated on the end of the bore, and a stop member 119. The valve spool 112 and plug valves 116 and 117 are normally urged upward by the bias spring 118 so that plug valve 117 contacts the closed end of the bore 111 while plug valve 116 is held in contact with plug valve 117 by spool valve 112.

Recessed portions are provided on the ends of the plug valves 116 and 117 and the spool valve 112 so that fluid may be admitted to or exhausted from the areas between the end of bore 111 and plug valve 117, the adjacent ends of plug valve 116 and 117, and the adjacent ends of plug valve 116 and spool valve 112. Shift signal ports 121, 122 and 123 are provided to admit fluid to or exhaust fluid from the above-mentioned areas respectively. Shift signal pressure fluid is communicated to the signal ports 121, 122 and 123 of the second shift valve, via passages 124, 125 and 126, respectively, which are in fluid communication with ports 98, 94 and 89 respectively of the manual shift valve 72. The shift signal ports 121a, 122a and 123a of the third shift valve 107 are in fluid communication with ports 95, 91 and 99, of the manual shift valve 72, via passages 127, 128 and 129 respectively. The shift signal ports 121b, 122b and 123b, of the fourth shift valve 105 are in fluid communication with ports 96, 100 and 93, of the manual shift valve 72, via passages 131, 132 and 133 respectively. When the first and second shift valve 109 is in the spring biased or unshifted position, as shown, the passage 108 is in fluid communication, around the spool valve 112 between lands 113 and 114, with a port 134. The port 134 is connected, via first ratio feed passage 135, with the first ratio motor 27 of the brake 22. The presence of a control signal in one of the shift signal ports 121, 122 or 123 causes the spool valve 112 to move against the spring 118 until it abuts the stop member 119. In this position, the port 134 and first ratio motor 27 are connected, around the spool valve 112 between lands 113 and 114, with a port 136 which is in fluid communication, via a passage 137 and through a low pressure check valve 138, with an exhaust port 139. With the first and second shift valve 109 in the shifted position, the passage 108 is in communication, around the spool valve 112 between lands 114 and 115, with a port 141 which is connected, via second ratio feed passage 142, to the second ratio motor 27a of brake 22a. When the shift valve 109 is in the unshifted position, the port 141 is connected to exhaust via port 143 and passage 137. The pressure level established by the check valve 138 is not sufficient to engage the clutches and brakes of the transmission, but it does keep the passages, leading to the clutches and brakes, full of fluid thereby reducing the fill time required when these devices are being engaged.

With the third shift valve 107 in the spring biased or unshifted position, the passage 106 is connected, around the spool valve 112a between lands 113a and 114a, with passage 108 which, as described above, is connected to the first and second shift valve 109. When a shift signal is applied to port 121a, 122a or 123a, the valve spool 112a is urged to the shifted position against the bias spring 118a until it abuts the stop member 119a. With the shift valve 107 in the shifted position, the passage 106 is in fluid communication, around the spool valve 112a between lands 114a and 115a to port 141a which is in fluid connection, via third ratio feed passage 144, with third ratio motor 27b of brake 22b. The passage 108 is opened, around spool valve 112a between lands 113a and 114a, to port 136a and theretthrough to exhaust passage 137.

With the fourth shift valve 105 in the spring biased or unshifted position, as shown, the passage 71 is in fluid communication, through shift valve 105, around spool valve 112b and between lands 113b and 114b, with passage 106. When a shift signal is present at one of the shift signal ports 121b, 122b or 123b, the spool valve 112b is urged to move against the force of spring 118b until it abuts the stop member 119b thereby permitting fluid communication, between lands 114b and 115b, from passage 71 to port 141b and a passage 145 which is connected thereto. The fourth ratio feed passage 145 conducts fluid to and from fourth motor 27c of clutch 26. Simultaneous with the opening of port 141b to passage 71, the passage 106 is opened to port 136b which is connected via passage 137 to exhaust 139 through check valve 138. The port 136a, of shift valve 107, has an annular recessed portion 146 to permit fluid to flow around land 113a when the shift valve 107 is in the unshifted position. When the fourth shift valve 105 is in the unshifted position, the passage 145 is connected through port 141b, between lands 114b and 115b, to port 143b and exhaust passage 137. The port 143a has an annular recessed portion 147 to permit fluid in exhaust passage 137 to flow around land 115a of spool valve 112a, when the third shift valve 107 is in the shifted position.

A branch of passage 108 is connected to a port 148 of a first and second trimmer valve 149. The function of the trimmer valve 149 is to control the rate of pressure increase in the motors 27 and 27a for brakes 22 and 22a while they are being engaged. The trimmer valve 149 includes a bore 151, in valve body 57, a poppet valve assembly 152 slidable within the bore 151 and in sealing relationship therewith, and a cup-shaped plug valve 153, in slidable sealing relation with the bore 151 and positioned between the poppet valve assembly 152 and one end of the bore 151. A spring 154 is held in compression between the closed end of plug valve 153 and the poppet valve assembly 152, while another spring 155 is held in compression between the plug valve 153 and one end of the bore 151. In the absence of pressure in line 108, the spring 155 has sufficient force to maintain the spring 154 compressed with the plug valve 153 contacting the poppet valve assembly 152 which in turn abuts the other end of the bore 151 adjacent to the port 148. The poppet valve assembly 152 includes a hollow cylindrical valve body 156 having a large opening on one end and smaller opening 157 at the other end. A poppet valve 158, between the two ends of the valve body, is held in sealing contact with the valve body 156 at an annular portion, surrounding the smaller opening 157, by a spring 159. One end of the spring 159 is supported by a snapring 161 and a groove 162 in the valve body 156. A restriction passage 163 permits fluid to pass slowly from port 148 through the opening 157 into the interior of the plug valve 153. A branch of passage 71 directs fluid to a restricted port 164 which is closed by the plug valve 153 until the plug valve 153 is moved against a stop member 165. When the plug valve 153 is positioned against the stop member 165, the restricted port 164 is opened to communicate fluid, under pressure, in passage 71 to the interior of the plug valve 153. Valve 149 is used to control the rate of engagement of the oncoming brake during shifting between F1 and F2, and downshifting from F3 and F2. As will be explained later, this function is also performed between R1 and R2 and between R3 and R2. During operation in first or second range, the line 108 is always connected to the feedline 106 by way of orifice 169. Thus, during steady state operation in these ranges, the chamber between 153 and 152 is virtually equal to line pressure. Accordingly, the plug 153 will be moved against spring 155 to bottom on stop 165. However, line 108 is fed through the restriction 169 and the pressure in line 108 will drop sharply during an engagement shift between 1st and 2nd due to the engagement flow. The spring 155 responds to this drop in line 108 pressure to quickly eject the small volume of oil from the chamber between 152 and 153 through the freely open check valve 158 and thence to line 108. Accordingly, for the simplification of the following explanation, consider the components of the valve 149 to be located as shown in FIGURE 1a.

When a F3–F2, F2–F1, or F1–F2 shift is made, the pressure in passage 108 collapses to a low level so that the first and second trimmer valve 149 assumes the position shown. As the engagement flow in passage 135 or 142 decreases due to the engagement of brake 22 or 22a, the pressure in line 108 will tend to rise. In response to this pressure rise, valve 156 and plug 153 will be forced upward against the spring 155 to expose port 148 to exhaust 166 thereby establishing a low limit of regulated pressure in passage 108. At this stage, fluid will gradually flow through restriction passage 163 to the closed chamber between 156 and 153 causing plug 153 to move against spring 155 to increase the regulating bias on 156 thereby gradually increasing the pressure in line 108. When the plug valve 153 contacts the stop 165, the next increment of flow through restriction passage 163 causes the valve 156 to move to close exhaust 166, and the pressure in 108 will rise sharply to its maximum value. An exhaust port 167 prevents fluid pressure from developing between plug valve 153 and the stop member 165. In order to provide initial drop of pressure in passage 108, a restriction 169 provides control of the engagement flow from passage 106 to passage 108. The fluid losses in the engagement passages 135 and 142 may tend to equal or exceed the flow capacity of this restriction at a pressure lower than main pressure. Accordingly, the engagement circuit could quite possibly be flow regulated at some pressure value less than the desired main pressure. This is especially true when a trimmer controls a rotating clutch where the fluid losses can be great through rotating seals or in a brake where the apply motor is large requiring extensive effective seal length. In this control, the first and second trimmer 149 controls large brake motors and a splitter trimmer 246 controls a rotating clutch. Thus, these trimmers have the main supply passage 71 and 198, respectively, connected to the restriction ports 164 and 164b. The restriction ports 164 and 164b are placed so that when the plug 153 approaches the stop 165, the fluid pressure is introduced to the chamber between members 153 and 156. This connection occurs at approximately 80 lbs./sq. in. in line 108 at the conclusion of the trim cycle. The main line at 120 lbs./sq. in. is open through restriction port 164 to feed the passage 108 freely through the check valve 152. Thus a double supply of fluid flow is directed to the engagement device to increase the operational life of the transmission.

The passage 144 has a branch, between the third shift valve 107 and the brake 22b, connected to a third trimmer valve 168 at a port 148a. The third trimmer valve 168, similar in construction to trimmer valve 149, functions to control the rate of pressure rise on piston 27b when the brake 22b is being engaged. Components of third trimmer valve 168, which have corresponding components in the first and second trimmer valve 149, are designated by the same character numeral with an "a" suffix. The operation of the third trimmer valve 168 is similar to the operation of the first and second trimmer valve 149, as described above. Thus when fluid is admitted to passage 144, to energize brake 22b, the pressure rise of the fluid in this passage is controlled by the third trimmer valve 168. The initial pressure rise causes the valve body 156a and plug valve 153a to move upward against spring 155a until the exhaust port 166a is opened so that the pressure in passage 144 is established at a low limit. The fluid then passes through resriction passage 163a to force a separation between valve body 156a and plug valve 153a to increase the regulating bias on valve body 156a so that the pressure in passage 144 is gradually increased. The gradual pressure rise continues, until the plug valve 153a abuts the stop 165a, at which time further flow through restriction passage 163a causes the valve body 156a to move downward and to close the exhaust port 166a. With the exhaust port 166a closed, a rapid pressure rise in the passage 144 will occur. Restriction 169 and 171, in passages 108 and 144 respectively, prevent any appreciable decrease in maximum system pressure, as established by the regulator valve 53, during the time of pressure rate control by the third trimmer valve 168.

The brake 42 of the reverse planetary set 16 is engaged and disengaged through a reverse shift valve 172 which includes a valve spool 173, having equal diameter lands a, b, c and d, slidably disposed in a valve bore 174 of the valve body 57 and held against one end of the valve bore by a spring 175. The shift valve 172 has a reverse signal port 176 and a forward signal port 177 which are connected, by passages 178 and 179, to ports 97 and 87, respectively, of the manual valve 72 and two exhaust ports 181 and 182 which are connected to exhaust check valve 138 via exhaust passage 137. When a reverse shift signal is present at port 176, the pressure acts on the end of valve spool 173 moving it against the force of spring 175 until the spool 173 abuts a stop member 180. With the valve spool 173 in this position, the fluid entering port 176 will flow past the end of the spool 173 to a port 183 and a passage 184 connected thereto. The fluid in passage 184 is directed to a port 185 of the regulator valve 53 to act on the plug valve 59 to move it upward in the bore 61 thereby compressing the spring 58 and increasing the maximum system pressure accordingly. The movement of the plug valve 59 is limited by a shoulder portion 186 of bore 61. The fluid in passage 184 is also directed through a port 187 of an engagement control valve 188 to a port 189 and a passage 191 which is connected to the reverse shift valve 172 through a port 192. With the shift valve 172, in the shifted position, fluid entering port 192 passes around the spool 173, between lands b and c, through a port 193 and a reverse ratio feed passage 194, connected between the port 193 and the reverse brake motor 45, to engage the reverse brake 42. The shift valve 172 also has a port 195 connected to passage 179 and provides a connection between 195 and port 183 when the shift valve 172 is in the unshifted position while the land d of spool 173 cooperates with a portion of bore 174 to block the connection between ports 195 and 183 when the shift valve 172 is in the shifted position. The reverse shift valve 172 also has a port 196, connected to passages 197 and 198, which is in fluid commuciation with port 192 when the shift valve 172 is in the unshifted position and is blocked, by land b cooperating with a portion of bore 174, from port 192 when the shift valve 172 is in the shifted position. Therefore, during neutral operation, passage 184 is exhausted. During reverse operation, passage 184 is fed by passage 71 via valve 73, port 97, passage 178, shift valve 172, ports 176 and 183, and during forward operation, passage 184 is fed by passage 71 via manual valve 72, port 87, passage 179, shift valve 172, and ports 195 and 183. Passages 184 is always connected to port 187 of the engagement control valve 188 and the pressure boost port 185. Thus the main pressure is boosted and the engagement valve is supplied by pressure fliud except when the control 72 is set for neutral. When a shift signal is present at port 177, the valve spool 173 is held in the unshifted position as shown in FIGURE 1.

Figure 3:
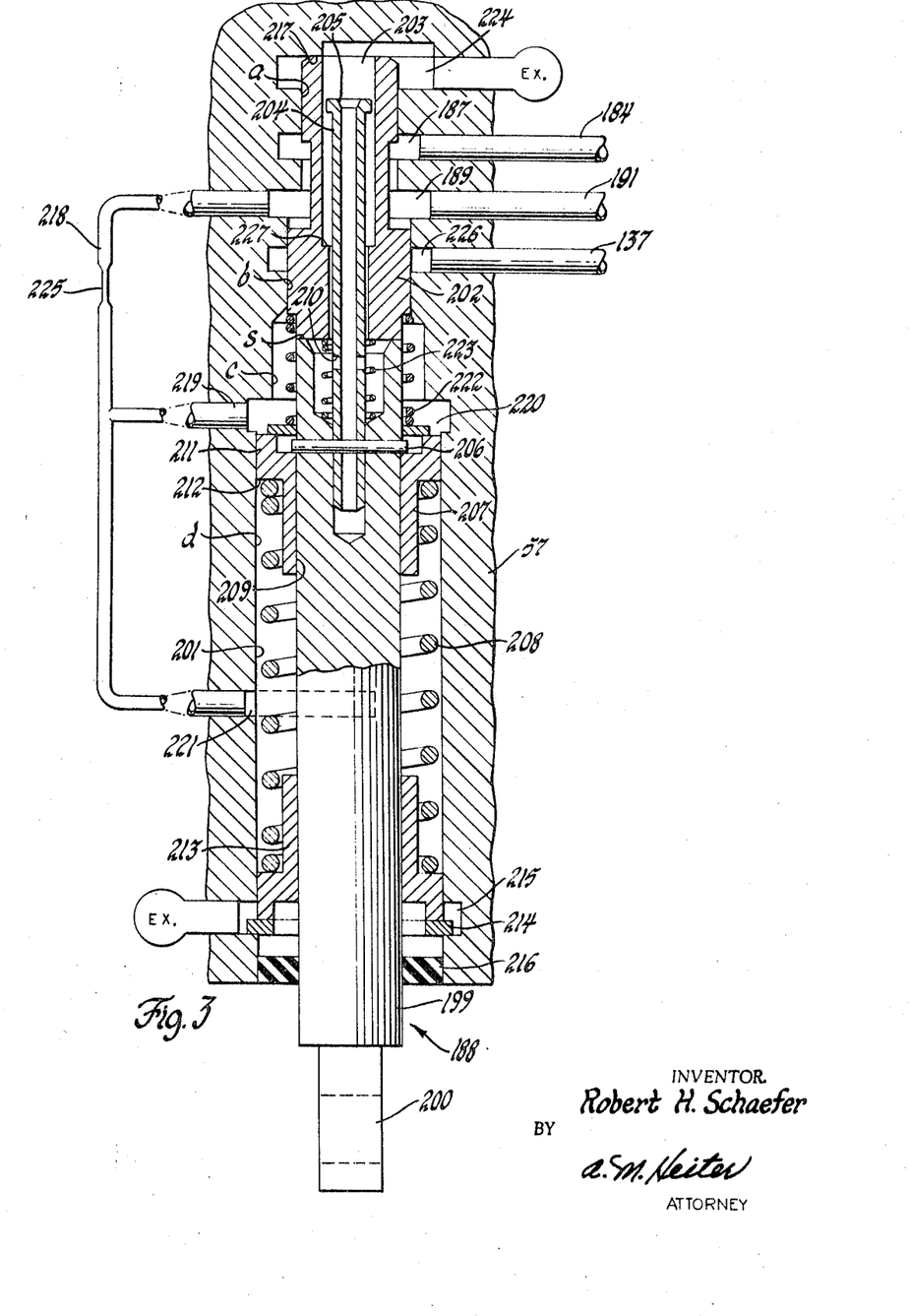
FIGURE 3 is an enlarged view of the engagement control valve shown in FIGURE 1.

The engagement control valve 188 is a variable pressure reducing valve which is manually operable to control the discharge pressure, of the control valve 188, in passage 191 from zero (0) to maximum system pressure, present in passage 184 which is the inlet pressure to the control valve 188. The engagement control valve 188 includes a manual input spool 199, a bore 201, having four different size diameters a, b, c and d, a regulating valve spool 202, having two lands a and b of different size diameters, slidable in diameters a and b of bore 201, and a stepped diameter axial aperture 203, and a shut-off tube 204 having a stop shoulder 205, which extends into the stepped aperture 203, and a passage 210 connecting the outside and inside diameters of tube 204. The shut-off tube 204 is secured to the manual input spool 199 by a pin 206 which extends radially through the tube 204 and the spool 199. The tube 204 slides in the smaller lower portion of the aperture and stop 205 slides in the larger upper portion of the aperture and engages the step therebetween to limit separating movement of the manual spool 199 and regulating valve spool 202. The outer ends of the pin 206 axially support a spring seat 207 held in contact therewith by a return spring 208. The spring seat 207 has an inner diameter 209 slidable on the input spool 199, an outer diameter 211 slidable in diameter of the bore 201 and a shoulder portion 212 which is contacted by the return spring 208. The spring seat 207 centrally locates the input spool in the bore 201. The return spring 208 also abuts another spring seat 213 which is similar in construction to spring seat 207 and assists in locating the input spool 199 in bore 201. The spring seat 213 is axially located in the valve body by a snapring 214 and a groove 215 in diameter d of bore 201. The input spool 199 extends out of the bore 201 through a seal member 216, secured in bore 201, which prevents fluid from leaking past the input spool 199 to atmosphere. The end 200 of the input spool 199 is adapted to be connected through linkages to a manually operable lever such as a clutch pedal, not shown. In the full pressure or open position shown, the return spring 208 urges the input spool 199 and the valve spool 202 upward in bore 201 so that the input spool 199 abuts the lower end of valve spool 202 while the upper end of regulating valve spool 202 abuts a shoulder 217 at the end of bore 201 thereby limiting the upward movement of the regulating valve spool 202. With the valve spool in this position, there is unrestricted fluid communication between inlet port 187 and discharge port 189, thus the engagement control valve is open. A passage 218 connects a portion of discharge port 189, through a restriction 225, to ports 219 and 221 which are in fluid communication with diameters c and d, of the bore 201, respectively. Input spool 199 abuts valve spool 202 at sealing surfaces s on both members thus closing the exhaust passage from port 219 to exhaust 224 to prevent loss of fluid for higher efficiency of the system. The area between seal s and diameter b is equivalent to the area between diameters a and b. Thus, since these are exposed to the same fluid pressure, the valve 202 is hydraulically balanced. The extended force of the return spring 208 is greater than the combined compressed force of two regulating springs 222 and 223 which are held in compression between the input spool 199 and the regulating valve spool 202. Thus, the engagement control valve remains open until the input spool 199 is moved manually thereby removing the force of the return spring 208 from the regulating valve spool 202.

When the input spool 199 is moved manually, the grounding force for spring 208 is removed from valve 202 and transferred to the manual input. Thus the combined forces of springs 222 and 223 tend to hold the valve 202 against stop 217 and the seal s is broken. With seal s broken, the fluid in chamber 220 can flow freely through passage 210 to the inside diameter of tube 204 and exhaust port 224. This free flow from chamber 220 produces essentially zero pressure in that chamber. The fluid force on valve 202, differential area between a and b, is thus unopposed and being greater than the combined forces of springs 223-224, causes valve 202 to follow the manual movement of input spool 199. As land a moves into closing relationship with port 187, the differential hydraulic force on valve 202 tends to be reduced permitting springs 222 and 223 to reopen land a with port 187, thereby metering or throttling the flow between ports 187 and 189. Thus, the pressure of the fluid in port 189 is reduced below the system pressure available at port 187. As the input spool 199 is moved downward, the compression force in regulator springs 222 and 223 is reduced, so that the pressure required in port 189, acting on the differential area to close supply port 187 from port 189 is also reduced. Thus it is evident that the pressure level in port 189 is controlled by the position of the input spool 199. If the input spool 199 is moved downward a sufficient amount, the flared end 205 of shut-off tube 204 will engage the stepped portion 227 of the aperture 203 thereby forcing the valve spool 202 to move downward with the input spool 199 so that inlet port 187 is fully closed by land a and discharge port 189 is fully open to exhaust port 226. This is the closed position of the engagement control valve 188. Thus it is obvious from the foregoing description that the pressure level in port 189 can be controlled manually between full maximum system pressure and zero (0). The relationship between the reduced pressure in port 189 and the input spool 199 position is determined by the spring rate constants of the regulator springs 222 and 223. For the embodiment disclosed, the spring rates of the regulator springs are different, and the higher rate spring, i.e. spring 223, is designed so that it will be fully extended, to its free length before the closed position of the engagement control valve 188 is reached. Therefore, the pressure in port 189 will be reduced more rapidly, relative to input spool position, during initial movement and less rapidly during final movement when the spring 223 has ceased to exert any force on the spool valve 202, as seen in FIGURE 2. At the end of regulation ("zero" pressures) the force of spring 222 also ceases to exist. Any slight resistance of valve 202 to resist closing port 187 will result in some pressure in line 189 under this no force condition. Accordingly, the before mentioned manual abutment of surfaces 205 and 227 will force the valve 202 down to enforce the full release of pressure in 189.

The brake 32 and the clutch 33 of the splitter gear unit 15 are connected by passageways 228 and 229 to ports 231 and 232 respectively of the splitter shift valve 233. The splitter shift valve 233 includes a valve spool 234 having equal diameter lands a, b, and c slidably disposed in a valve bore 235 in the valve body 57. The valve spool 234 is held in contact with one end of the valve bore 235 by a spring 236. Two shift signal ports 237 and 238 are connected via passageways 239 and 241 to ports 88 and 92 respectively of the manual shift valve 72. When a shift signal pressure is available at port 237, the valve spool 234 is moved against the force of spring 236 until it contacts a stop member 242. With the valve in this position, fluid under pressure in passage 197 enters the shift valve 233 through a port 243 and passes around the valve spool 234 between lands b and c to port 231 and low ratio feed passage 228 thereby engaging the splitter low brake 232. At this time, the high ratio feed passage 229 is open around the valve spool 234 between lands a and b to an exhaust port 244 and exhaust passage 137 connected thereto. Thus the splitter low brake is engaged while the splitter high clutch is disengaged to provide a low ratio drive to the splitter unit. When no shift signals are present or when shift signals are present at both ports 237 and 238, the spring 236 moves the spool 234 to the end of valve bore 235 thereby providing fluid communication from passage 197 to high ratio feed passage 229 so that the splitter high clutch 33 will be engaged. At the same time, the low ratio feed passage 228 is connected by the splitter shift valve 233 to an exhaust port 245 and the exhaust line 137. Thus the splitter high clutch is engaged while the splitter low brake is disengaged to provide a high ratio drive through the splitter gear unit 15.

As was previously mentioned, the passage 197 is in fluid communication with the passage 198 which is connected to an orifice port 164b of the splitter trimmer valve 246. The splitter trimmer valve 246 is similar in construction to the first and second trimmer valve 149 and operates in the same manner as was previously described for the first and second trimmer valve 149. Therefore, the components of the splitter trimmer valve 246 have been identified with the same numeral designation with a "b" suffix as their corresponding components in the first and second trimmer alve 149 and reference is made to the above description of trimmer valve 149.

The pressure of the fluid in passage 197 is determined by engagement control valve 188 which is previously discussed as a manually operated valve. Thus the operator can control the range of engagement and the engagement pressure of the friction devices in the splitter unit 15 or the reverse unit 16 to provide smooth starting of the vehicle. Should the operator open the engagement control valve too rapidly or through the use of the manual valve 72 cause a shift to occur in the splitter unit, the splitter trimmer valve 246 is operative to control the pressure of the fluid direction to friction devices so that a controlled engagement is achieved. Thus the friction devices in the splitter unit may be controlled manually or automatically.

The range shift valves 105, 107 and 109 are in staged relation with each other such that when a shift from one raito to a higher ratio occurs, in the range unit, the system pressure necessary to engage the friction devices cannot pass from the higher ratio shift valve to the lower ratio shift valve. Thus, upon completion of an upshift, the lower ratio is automatically disengaged since fluid under pressure is not available to energize its respective friction device.

When the manual valve 72 is in the neutral (N) position, as shown, fluid under pressure is deliered via port 88 and passage 239 to the splitter low signal port 237 moving the splitter shift valve 233 to the shifted position. Fluid is also delivered via the range shift valves 105, 107 and 109 to passage 135 and the first ratio motor 27 of brake 22 to condition the range unit 11 for low ratio. The other hydraulic motors 27a, 27b, and 27c of the range unit 11 are exhausted, via passages 142, 144 and 145 respectively, through the shift valves 109, 107 and 105 to exhaust passage 137. However, no drive between the input and output shaft is established until either a splitter ratio or reverse ratio is established. The splitter low motor is exhausted, via passage 228 through the splitter shift valve 233 to passage 197 which is connected through the reverse shift valve 172 to passage 191; then through the engagement control valve 188 to passage 184, which is connected through the reverse shift valve 172 to passage 179 which is connected to exhaust port 101a via the manual shift valve. The splitter high motor 37a is connected via passage 229, through the splitter shift valve 233 to exhaust passage 137.

The reverse motor 45 is exhausted via passage 194 through the reverse shift valve 172 to exhaust passage 137.

When the manual valve 72 is moved to the F1 position, the fluid, under pressure, around the grooved portion of spool 73 is directed to port 87 and passage 179 which are opened by land 76. Passage 179 connects to one end of the reverse shift valve 172, to prevent shifting thereof, and through the shift valve 172 to the engagement control valve 188. Preferably the engagement control valve would be closed at this time to prevent engagement of the splitter gear unit 15. To engage the splitter unit, the operator slowly opens the engagement control valve 188 to permit a slow build-up of pressure in passage 191 and 197 and, through the splitter shift valve 233, passage 228 and the splitter low brake 32. Thus a gradual engagement of the transmission is provided to drive the vehicle. The other hydraulic motors remain disengaged because they are connected to exhaust as described above during operation in neutral (N).

With the vehicle moving, the operator may move the manual valve to F2, thus providing signal pressure via axial passage 84 and oblique passage 85 to port 89, passage 126 and signal port 123 to cause the first and second shift valve to assume the shifting position. As was mentioned previously, this permits first ratio brake 22 to disengage, since first ratio motor 27 is exhaust via passage 135 through the shift valve 109 to exhaust passage 137, and brake 22a to engage, as fluid under pressure is delivered to second ratio motor 27a from passage 108 via shift valve 109 and passage 142, while the splitter low ratio remains engaged. The first and second trimmer valve 149 functions at this time to control the engagement rate of the brake 22a.

When the manual valve 72 is moved to the F3 position, the port 89 is exhausted between lands 74 and 75 of the spool 73, through the oblique passage 103 to exhaust port 101a; while the port 91, passage 128 and signal port 122a, of the third shift valve are pressurized via axial passage 84 and oblique passage 85. Thus the third shift valve 107 assumes the shifted position thereby directing fluid to the third ratio motor 27b from passage 106 via the third shift valve 107 and passage 144, to engage brake 22b, as controlled by the third trimmer valve 168, while the first and second shift valve 109 under the action of spring 118, assumes the unshifted position to exhaust second ratio motor 27a via passage 142 through the shift valve 109 to exhaust passage 137 thereby disengaging brake 22a. Also passages 108 and 135 are connected to exhaust through the third shift valve 107 and exhaust passage 137 so that engagement of brake 22 cannot occur.

When the manual valve 72 is moved to the F4 position, the signal port 122a is exhausted so the third shift valve 107 returns to its unshifted position; while the port 92 is pressurized causing the splitter shift valve 233 to be shifted to permit disengagement of the splitter low brake 32 since the low ratio motor 37 is exhausted via passage 228 through the splitter shift valve 233 to exhaust passage 137 and engagement of the splitter high clutch 33 since fluid is delivered to motor 37a from passage 197 via the spitter shift valve 233 and passage 229. The engagement of the clutch 33 is controlled by the splitter trimmer valve 246. Also, there are no signals to the range shift valves and these are in their unshifted position, thus the low brake 22 is engaged as described above for neutral (N).

When the manual valve 72 is moved to F5, the port 92 is exhausted to permit the splitter shift valve 233, under the influence of pressure in port 237, to move against the spring 236 so that splitter high clutch 33 is disengaged via passage 229 through the splitter shift valve 233 to exhaust passage 137 while brake 32 is engaged by fluid in passage 228 from passage 197 through the splitter shift valve 233. Also the port 93, of the manual valve is pressurized which causes the fourth shift valve 105 to assume its shifted position so that lock-up clutch 26 is engaged since fluid is supplied to fourth ratio motor 27c from passage 71 via the fourth shift valve 105 and passage 145. When the fourth shift valve 105 is shifted, the passages 106 and 108 are connected to exhaust to provide for disengagement of brake 22.

When the manual valve 72 is moved to F6, the port 88, or valve 72, is connected to exhaust port 101 thus removing the bias pressure on the splitter shift valve 233 to permit it, under the action of spring 236, to assume the splitter high position so that the splitter high clutch 33 will be engaged while the splitter low brake 32 is disengaged as described above for F4. Also, the port 94 is pressurized thereby providing a shift signal to port 122, of the first and second shift valve 109, so that brake 22a may be engaged as described above for F2 while port 93 is exhausted so that the fourth shift valve 105 will assume its unshifted position thereby exhausting fourth ratio motor 27c via passage 145 through the shift valve 105 to exhaust passage 137.

When the manual valve is moved to F7, the ports 94 and 88 are exhausted while port 95 is pressurized thereby permitting the first and second shift valve to assume its unshifted position and the splitter is conditioned as in F6, while the third shift valve is urged, by pressure in port 121a, to assume its shifted position thereby disengaging brake 22a and engaging brake 22b as described above for F3.

When the manual valve 72 is moved to F8, the ports 95 and 88 are exhausted while the port 96 is pressurized thereby permitting the third shift valve 107 to assume its unshifted position and the splitter is conditioned as in F6, while the fourth shift valve 105 is urged to its shifted position thereby disengaging brake 22b since the third ratio motor is exhausted via passage 144 through the third shift valve 107 to exhaust passage 137 and engaging clutch lock-up clutch 26 as described above for F5.

To establish low reverse ratio (R1) the manual valve 72 is moved so that the port 97 is opened to permit the fluid, under pressure, around the groove portion 73 to flow through passage 178 to port 176, of the reverse shift valve 172, thereby causing the shift valve 172 to move against the spring 175. The fluid then enters passage 184 and the engagement control valve 188 connected thereto. Preferably the engagement control valve is closed at this time by the operator. Low ratio of the range set 11 is engaged since all of the ring shift valves are in their unshifted position, as described above for neutral (N). When the operator opens the engagement control valve 188, fluid is directed through the engagement control valve 188 and the reverse shift valve to the reverse motor 45 of the brake 42 thus completing the drive train between input shaft 17 and output shaft 18.

When the operator moves the manual valve 72 to the R2 position, fluid enters passage 124 to cause the first and second shift valve 109 to move, thereby disengaging brake 22 and engaging brake 22a as described above for F2. The reverse unit remains engaged.

When the manual valve 72 is moved to R3, fluid enters passage 129, thereby supplying pressure to signal port 123a to move the third shift valve 107 against the spring 118a so that brake 22b is engaged as described for F3. At the same time, passage 108 is connected to exhaust passage 137, through the third shift valve 107, thereby permitting disengagement of the brake 22a via passage 142 through shift valve 109 to passage 108.

When the manual valve 72 is moved to R4, fluid enters passage 132 thereby supplying a signal pressure to the fourth shift valve 105 to move it against the spring 118b so that the lock-up clutch 26 is engaged and fourth ratio in the range unit is established as described above for F5. At the same time, the passage 106 is exhausted, by exhaust passage 137, through the fourth shift valve 105 thereby permitting the disengagement of brake 22b via passage 144 through the third shift 107 to passage 106.

The following chart shows the friction devices engaged and the shift valves that are operated to obtain the various speed ratios available with this transmission:

| Manual valve position | Range unit | Splitter unit | Reverse unit | X-shifted | | | | |
|---|---|---|---|---|---|---|---|---|
| | | | | Shift valves shifted | | | | |
| | | | | 1 and 2 | 3rd | 4th | Split | Reverse |
| N | 22 | | | | | | X | |
| F1 | 22 | 32 | | | | | X | |
| F2 | 22a | 32 | | X | | | X | |
| F3 | 22b | 32 | | | X | | X | |
| F4 | 22 | 33 | | | | | X | |
| F5 | 26 | 32 | | | | X | X | |
| F6 | 22a | 33 | | X | | | X | |
| F7 | 22b | 33 | | | X | | X | |
| F8 | 26 | 33 | | | | X | X | |
| R1 | 22 | | 42 | | | | | X |
| R2 | 22a | | 42 | X | | | | X |
| R3 | 22b | | 42 | X | X | | | X |
| R4 | 26 | | 42 | X | X | X | | X |

Thus it should be appreciated from the above description that only five shift valves are used to provide a control for a transmission having eight forward and four reverse drive ratios.

All of the reverse ratios may not be needed in some of the vehicles to which this system is adaptable. To eliminate the ratios not desired, the signal passages, between the manual valve 72 and the shift valve not being used, may be closed or eliminated.

Many modifications and variations are possible in light of the above teachings. It is, therefore, to be understood, that within the scope of the appended claims, the invention may be practiced otherwise than as specifically described.

What is claimed is:

1. In combination a transmission having a plurality of fluid actuated friction devices for forward and reverse drive ratios; and control means including a source of fluid under pressure; passage means operatively connected to said source for conducting said fluid; shift valve means including a plurality of shift valves shiftable for selectively directing fluid in a portion of said passage means from said source to said friction devices to engage and exhaust said friction devices; manual selector valve means operable to direct fluid in a portion of said passage means from said source to said shift valve means to selectively shift said shift valves; manually operable engagement control valve means, between said source and at least two of said shift valves, for controlling the pressure level of the fluid, in a portion of said passage means delivered from the source to at least three of said friction devices, as directed by the shift valves.

2. The invention defined in claim 1 and said engagement control valve means comprising: a valve bore having an inlet port, an outlet port and an exhaust port; a valve member, slidable in said valve bore to open and closed positions, having a small diameter, a large diameter, a recessed portion between said diameters, and an axial aperture; control means having a manually operable member, movable between on and off positions, and return spring means to urge said manually operable member, to said on position, against said valve member to establish said open position permitting fluid communication between said inlet and output ports; closing means, secured to said manually operable member, for engaging a portion of said axial aperture upon movement of said manually operable member to said off position, to establish said closed position preventing fluid communication between said inlet and outlet ports and permitting fluid communication between said outlet and exhaust ports; and regulating spring means held in compression between said valve member and said manually operable member to exert a variable force on said valve member so that fluid pressure acting on a differential area between said small and large diameters urges said valve member toward said closed position to provide a reduction in pressure between said inlet and outlet ports when said manually operable member is moved to a plurality of positions between said on and off positions.

3. The invention defined in claim 1 and at least two of said shift valves being connected in series to provide engagement of a first of said friction devices when none of said shift valves are shifted; exhausting said first friction device while engaging a second of said friction devices when one of said shift valves is shifted; and exhausting said first and second friction devices while engaging a third of said friction devices when the other of said shift valves is shifted.

4. The invention defined in claim 1 and said manual selector valve means comprising: a valve bore having an inlet port, a plurality of outlet ports and an exhaust port; a valve spool manually movable in said valve bore comprising a pair of single lands axially spaced of a grooved portion, a double land having a circumferential groove selectively alignable with at least three of said outlet ports individually, spaced from one of said single lands by a recessed portion, a central axial passage, closed at both ends, communicating with said grooved portion by a radial passage and with said circumferential groove by a first oblique passage; a second oblique passage, substantially parallel to said first oblique passage, communicating said recessed portion with said exhaust port; and ball detent means to resiliently hold said valve spool aligned with one of said three outlet ports while the other two of said three outlet ports are communicated to said exhaust port.

5. The invention defined in claim 1 and said control further including an automatic engagement control means, in fluid communication with said manually operable engagement control valve means and at least one of said shift valves, operable to control the engagement of at least one of said friction devices at a predetermined rate when said manually operable engagement control valve is in an open position and said shift valve is shifted.

6. In combination a planetary transmission having a plurality of selectively operable friction devices for establishing forward and reverse drive ratios; and a control system comprising a source of fluid pressure; fluid passage means; at least two shift valves shiftable for selectively directing fluid from said source through said passage means to operate said friction devices; signal means for selectively shifting said shift valves; and engagement control means for variably controlling the pressure of the fluid delivered from said source as directed by said shift valves to at least three of said friction devices.

7. The invention defined in claim 6 and said engagement control valve means comprising: a valve bore having an inlet port, an outlet port and an exhaust port; a valve member, slidable in said valve bore to open and closed positions, having a small diameter, a large diameter, a recessed portion between said diameters, and an axial aperture; input means having a manually operable member, movable between on and off positions, and return spring means to urge said manually operable member, to said on position, against said valve member to establish said open position permitting fluid communication between said inlet and outlet ports; closing means, secured to said manually operable member, for engaging a portion of said axial aperture upon movement of said manually operable member to said off position, to establish said closed position preventing fluid communication between said inlet and outlet ports and permitting fluid communication between said outlet and exhaust ports; and regulating spring means held in compression between said valve member and said manually operable member to exert a variable force on said valve member so that fluid pressure acting on a differential area between said small and large diameters urges said valve member toward said closed position to provide a reduction in pressure between said inlet and outlet ports when said manually operable member is moved to a plurality of positions between said on and off positions.

8. The invention defined in claim 6 and said control system further including a manual selector valve means for selectively shifting said shift valves comprising: a valve bore having an inlet port connected to said source, a plurality of outlet ports connected to said shift valves, and an exhaust port; a valve spool manually movable in said valve bore comprising a pair of single lands axially spaced of a grooved portion, a double land having a circumferential groove selectively alignable with at least three of said outlet ports individually, spaced from one of said single lands by a recessed portion, a first oblique passage, a central axial passage, closed at both ends, communicating with said grooved portion by a radial passage and with said circumferential groove by said first oblique passage; a second oblique passage, substantially parallel to said first oblique passage, communicating said recessed portion with said exhaust port; and ball detent means to resiliently hold said valve spool aligned with one of said three outlet ports while the other two of said three outlet ports are communicated to said exhaust port.

9. A transmission comprising in combination input means; range gear means drivingly connected to said input means including a plurality of fluid actuated friction drive establishing means selectively operable to provide a plurality of drive ratios in said range gear means; forward and reverse gear means drivingly connected to said range gear means having a plurality of fluid actuated friction drive establishing means selectively operable to provide a plurality of forward and reverse drive ratios; output means drivingly connected to said forward and reverse gear means; and control means including a regulated source of fluid pressure, a manually operated source of variable fluid pressure including engagement control valve means operatively connected to said regulated source of fluid pressure, a plurality of range shift valves operatively connected between said regulated source of fluid pressure and said range unit friction drive establishing means being selectively shiftable to actuate and de-actuate said range unit drive establishing means to provide said range unit drive ratios; and a plurality of forward and reverse shift valves operatively connected between said manual source of variable fluid pressure and said forward and reverse drive establishing means and being selectively shiftable to direct fluid to actuate and de-actuate said forward and reverse friction drive establishing means to establish said plurality of forward and reverse drive ratios, said range gear means and said forward and reverse gear means being selectively operable to provide a drive between said input and output means, said manual source of variable fluid pressure being operable to de-actuate said forward and reverse torque establishing devices, as directed by, said forward and reverse shift valves, to disconnect the drive between said input means and said output means.

10. The invention defined in claim 9; said control means further including shift control means, operable to actuate and de-actuate said drive establishing means, comprising a manual selector valve having a valve bore with an inlet port in fluid communication with said regulated source of fluid pressure, a plurality of outlet ports operatively connected to said range shift valve means and said forward and reverse shift valve means, and an exhaust port, and a valve spool slidably disposed in said valve bore having a double land portion with a grooved outer diameter selectively alignable with said outlet ports individually, a recessed portion adjacent said double land portion, a central passage communicating with said inlet port, a first passage oblique to said central passage communicating said central passage with said double land portion, and a second passage oblique to said central passage and communicating said recessed portion with said exhaust port.

11. The invention defined in claim 9 and said engagement control valve means comprising: a valve bore having an inlet port, an outlet port and an exhaust port; a valve member, slidable in said valve bore to open and closed positions, having a small diameter, a large diameter, a recessed portion between said diameters, and an axial aperture; input means having a manually operable member, movable between on and off positions, and return spring means to urge said manually operable member, to said on position, against said valve member to establish said open position permitting fluid communication between said inlet and outlet ports; closing means, secured to said manually operable member, for engaging a portion of said axial aperture upon movement of said manually operable member to said off position, to establish said closed position preventing fluid communication between said inlet and outlet ports and permitting fluid communication between said outlet and exhaust ports; and regulating spring means held in compression between said valve member and said manually operable member to exert a variable force on said valve member so that fluid pressure acting on a differential area between said small and large diameters urges said valve member toward said closed position to provide a reduction in pressure between said inlet and outlet ports when said manually operable member is moved to a plurality of positions between said on and off positions.

12. A transmission comprising in combination input means; range gear means, including a plurality of fluid actuated range friction drive establishing devices, drivingly connected to said input means; forward and reverse gear means drivingly connected to said range gear means and including a plurality of fluid actuated forward and reverse friction drive establishing devices; output means drivingly connected to said forward and reverse gear means; and control means including a first source of pressure having a regulator valve to establish a substantially constant pressure level, a plurality of range shift valves operatively connected between said fluid actuated range friction drive establishing devices and said first source of fluid pressure and being selectively shiftable to actuate and de-actuate said range friction drive establishing devices, the number of said shift valves being one less than the number of said range friction drive establishing devices such that when none of the range shift valves are operated one of said range friction drive establishing devices is actuated, a second source of fluid pressure operatively connected to said first source of fluid pressure having manual control means for selectively establishing the pressure level at said second source between minimum and maximum predetermined values, a plurality of forward and reverse shift valves operatively connected between said second source of fluid pressure and said forward and reverse friction drive establishing devices and being selectively shiftable to actuate and de-actuate said forward and reverse friction drive establishing devices, the number of said forward and reverse shift valves being one less than the number of forward and reverse friction drive establishing devices such that when none of the forward and reverse shift valves are operated one of said forward and reverse friction torque establishing devices is connected to said second source, and shift selector means operatively connected between said first source and said range shift valves and said forward and reverse shift valves, said range shift valves being selectively operated by said shift selector means to establish a plurality of drive ratios between said input means and said forward and reverse gear means and said forward and reverse shift valves being selectively operated by said shift selector means to establish a plurality of forward and reverse drive ratios between said range unit and said output means.

13. A transmission comprising in combination drive ratio means including a plurality of selectively operable fluid actuated drive establishing means for establishing a plurality of forward and reverse drive ratios in said drive ratio means; and control means comprising a source of fluid pressure, and shift control means, operable to actuate and de-actuate said drive establishing means, comprising a manual selector valve having a valve bore with an inlet port in fluid communication with said source, a plurality of outlet ports operatively connected to said drive establishing means, and an exhaust port, and a valve spool slidably disposed in said valve bore having a double-land portion with a grooved outer diameter selectively alignable with said outlet ports individually, a recessed portion adjacent said double-land portion, a central passage communicating with said inlet port, a first passage oblique to said central passage communicating said central passage with said double-land portion, and a second passage oblique to said central passage and communicating said recessed portion with said exhaust port.

14. In combination a transmission having first fluid actuated friction means for providing forward and reverse drive ratios; second fluid actuated friction means for providing range drive ratios; and control means including a source of fluid pressure; passage means operatively connected to said source and to said first and second friction means for conducting said fluid; first shift valve means, in a portion of said passage means, operative to direct fluid to selectively engage and disengage said first fluid actuated friction means; second shift valve means, in another portion of said passage means, operative to direct fluid to selectively engage and disengage said second fluid actuated friction means; manually operable engagement control valve means, operatively connected in said passage means between said source and said first shift valve means, for providing a variable control pressure for selectively controlling engagement and disengagement of said first fluid actuated friction devices as directed by said first shift valve means; and manual shift control means; in said passage means between said source and said first and second shift valve means, for selectively operating said first and second shift valve means.

15. In combination a transmission having input means; output means; gear means; operatively connected between said input and output means, for providing a plurality of drive ratios therebetween; a plurality of fluid actuated drive establishing means, operatively connected to said gear means, selectively engageable and disengageable for providing said drive ratios; and control means including a source of fluid pressure, shift selector means operatively connected to said source, and at least three shift valve means operatively connected to said shift selector means and being operated thereby to selectively connect said source to a first of said fluid actuated drive establishing means to engage said one drive establishing means when none of said shift valve means is operated, disengaging said first drive establishing means while engaging a second of said drive establishing means when a first of said shift valve means is operated, disengaging said first and second drive establishing means while engaging a third of said drive establishing means when a second of said shift valve means is operated, and disengaging said first, second and third drive establishing means while engaging a fourth of said drive establishing means when a third of said shaft valve means is operated.

16. The invention defined in claim 15 and said gear means including a range gear section drivingly connected to said input means and operatively connected to said drive establishing means, and a forward-reverse gear section drivingly connected between said range gear section and said output means; and said fluid actuated drive establishing means including forward-reserve drive establishing means operatively connected to said forward-reverse gear section; and said control means further including manual variable pressure engaging means, operatively connected between said source and said forward-reverse drive establishing means, for selectively engaging and disengaging said forward-reverse drive establishing means to provide and prevent power transmission respectively between said range gear section and said output means.

17. In a hydraulic control fluid actuated means responsive to a variable actuating pressure; a source of substantially constant fluid pressure; and variable pressure means for providing said variable actuating pressure including a valve bore having an inlet port and an outlet port, a valve spool, slidably mounted in said valve bore movable to an open position and a closed position, having a large diameter adjacent said outlet port and a small diameter adjacent said inlet port providing unrestricted flow of pressure fluid between said inlet and outlet ports in said open position, variable force spring means urging said valve spool to said open position, said pressure fluid in said outlet port acting on a differential area between said large diameter and said small diameter adjacent said outlet port to urge said valve spool toward the closed position to cause said small diameter to move into closing relation with said inlet port to provide a reduced pressure in said outlet port proportional to said variable force spring means.

18. The invention defined in claim 17 and said valve spool having an axial bore with a large diameter portion and a small diameter portion; and said variable pressure means further including manual means slidably mounted in said valve bore abutting said variable force spring means and said valve spool to establish said open position, and closing means including a tube member operatively connected to said manual means and extending into said axial bore and being slidably supported in said small diameter portion, and an expanded end on said tube member located in said large diameter portion, said closing means being operative to establish said closed position to prevent the flow of pressure fluid from said inlet port to said outlet port.

19. In a hydraulic control a variable fluid pressure reducing valve comprising: a valve bore having a small diameter portion with an inlet port operatively connected thereto, and a large diameter portion with a reduced pressure port operatively connected thereto; a valve spool, slidable in said valve bore and movable to open and closed positions having a small diameter land in said small diameter portion, a large diameter land in said large diameter portion, a recessed portion between said small and large diameter lands to permit unrestricted flow of pressure fluid between said inlet and reduced pressure ports in said opened position, and a differential area portion on said large diameter land adjacent said reduced pressure port being acted upon by pressure fluid in said reduced pressure port supplying a differential area force urging the valve spool toward said closed position; variable biasing means acting on said valve spool supplying a variable force urging said valve spool to said opened position in opposition to said differential area force; and opening means movable to on and off positions and contacting said valve spool and said biasing means to maintain said valve spool in said opened position in said on position and contacting only said biasing means when moved between said on and off positions; said biasing force and said differential area force cooperating to provide a reduced fluid pressure in said reduced pressure port in response to the position of said opening means between said on and off positions.

20. The invention defined in claim 19 and said valve spool further having an axial stepped diameter bore, and said variable fluid pressure reducing valve further including means, secured to said opening means, including a tube member extending into said axial stepped diameter bore and an expanded end on said tube member operative to engage a portion of said stepped diameter bore upon movement of said opening means to said off position, said closing means being operative on said valve spool to move said valve spool to said closed position to prevent fluid flow from said inlet port to said outlet port.

21. A pressure reducing valve for use in a hydraulic control including a valve bore having an inlet port and an outlet port; a valve spool, movable in said valve bore between open and closed positions, having an unbalanced area adjacent said outlet port; fluid pressure in said outlet port acting on said unbalanced area to urge the valve spool toward said closed position to restrict flow from said inlet port to said outlet port; biasing means, acting on said valve spool to urge said valve spool to said open position to permit unrestricted flow from said inlet port to said outlet port, including first and second spring means both operable on said valve spool when the valve spool is in an initial portion between said open and closed position and in only one of said spring means acting on the valve spool and the valve spool is in a final portion between said open and closed positions; and control means, positional to permit movement of said valve spool between the open and closed positions, cooperating with said biasing means to provide initial and final linear relationships between the control means position and the fluid pressure in said outlet port.

22. A pressure reducing valve for use with a hydraulic control including a valve bore having an inlet port, an outlet port and an exhaust port; a valve spool having a central axial bore with a large diameter portion and a small diameter portion, slidably mounted in said valve bore, and movable to an open position to provide unrestricted fluid pressure communication between said inlet and outlet ports, a closed position to prevent fluid pressure communication between said inlet and outlet ports, and between said opened and closed positions to provide reduced fluid pressure at said outlet port; spring means in said valve bore abutting said valve spool; manual control means movable in said valve bore to establish said open position and cooperating with said spring means to establish the reduced fluid pressure at said outlet port; and closing means including a tube member, operatively connected to said manual control means and slidably mounted in said small diameter portion, having an expanded end in said large diameter portion and being movable with said manual control means to permit said expanded end to abut a portion of said axial bore to move said valve spool to said closed position.

23. The invention defined in claim 22 and said reducing valve further including a control port and passage means, having a restriction therein, between said outlet port and said control port; and said closing mean including an exhaust passage in fluid communication with said exhaust port; and shut-off means on said manual control means and said valve spool being operable to prevent fluid communication between said control port and said exhaust passage when said valve spool is in said opened position and to permit fluid communication between said control port and said exhaust passage when said valve spool is between said opened and closed positions and in said closed position.

References Cited

UNITED STATES PATENTS

| | | | |
|---|---|---|---|
| 3,101,012 | 8/1963 | Christenson et al. | 74—759 X |
| 3,195,559 | 7/1965 | Stacey | 137—625.68 X |
| 3,207,182 | 9/1965 | Edmunds | 137—625.68 |
| 3,255,642 | 6/1966 | Christenson et al. | 74—759 X |
| 3,267,769 | 8/1966 | Tuck et al. | 74—759 |
| 3,282,131 | 11/1966 | Smith | 74—758 |
| 3,293,934 | 12/1966 | Schaefer et al. | 74—759 X |
| 3,410,157 | 11/1968 | Livezey | 74—758 |

ARTHUR T. McKEON, Primary Examiner

U.S. Cl. X.R.

137—495, 625; 74—754, 761, 765, 785